United States Patent
Arnelöf et al.

(10) Patent No.: US 12,054,126 B2
(45) Date of Patent: Aug. 6, 2024

(54) RETARDER ARRANGEMENT AND RELATED DEVICES

(71) Applicant: Scania CV AB, Södertälje (SE)

(72) Inventors: Per Arnelöf, Vendelsö (SE); Nichlas Florén, Nyköping (SE); Peer Norberg, Hägersten (SE)

(73) Assignee: Scania CV AB, Södertälje (SE)

( * ) Notice: Subject to any disclaimer, the term of this patent is extended or adjusted under 35 U.S.C. 154(b) by 322 days.

(21) Appl. No.: 17/272,547

(22) PCT Filed: Aug. 28, 2019

(86) PCT No.: PCT/SE2019/050800
§ 371 (c)(1),
(2) Date: Mar. 1, 2021

(87) PCT Pub. No.: WO2020/060462
PCT Pub. Date: Mar. 26, 2020

(65) Prior Publication Data
US 2021/0323512 A1  Oct. 21, 2021

(30) Foreign Application Priority Data
Sep. 18, 2018 (SE) .................................. 1851100-6

(51) Int. Cl.
*B60T 1/06* (2006.01)
*B60T 1/087* (2006.01)
(Continued)

(52) U.S. Cl.
CPC .............. *B60T 1/062* (2013.01); *B60T 1/087* (2013.01); *B60T 10/02* (2013.01); *F16D 57/00* (2013.01);
(Continued)

(58) Field of Classification Search
CPC .......... B60T 1/062; B60T 1/087; B60T 10/02; F16D 57/00; F16D 65/16; F16H 57/0436
(Continued)

(56) References Cited

U.S. PATENT DOCUMENTS

| | | | | |
|---|---|---|---|---|
| 4,191,072 A | * | 3/1980 | Ehrlinger ................ | F16D 65/78 475/159 |
| 4,269,289 A | * | 5/1981 | Winkler .................. | F16D 57/00 188/71.6 |
| 4,480,728 A | * | 11/1984 | Bailey ................... | B60T 13/585 192/221 |

(Continued)

FOREIGN PATENT DOCUMENTS

| | | |
|---|---|---|
| DE | 10 2007 021 686 A1 | 11/2008 |
| DE | 10 2009 026 721 A1 | 12/2010 |

(Continued)

OTHER PUBLICATIONS

Novelty Search Report dated May 22, 2018.
(Continued)

*Primary Examiner* — Colby M Hansen
(74) *Attorney, Agent, or Firm* — Banner & Witcoff, Ltd.

(57) ABSTRACT

A retarder arrangement (1) is configured to brake rotation of a shaft (3) of a vehicle (5). The arrangement (1) includes a retarder rotor (7), a retarder transmission (9), a lubricant feed conduit (11) arranged to conduct lubricant to the retarder transmission (9), a coupling device (13), and an actuator element (15). The actuator element (15) is moveable between an actuated position and an unactuated position to move the coupling device (13) between an engaged state and a disengaged state. The coupling device (13) is configured, in the engaged state, to connect the retarder rotor (7) to the shaft (3) via the retarder transmission (9), and in the disengaged state, to disconnect the retarder rotor (7) from the shaft (3). The lubricant teed conduit (11) includes a valve (17) mechanically connected to the actuator element (15).

(Continued)

The present disclosure further relates to a transmission arrangement (40), a power train (50), and a vehicle (5).

13 Claims, 3 Drawing Sheets

(51) Int. Cl.
  *B60T 10/02* (2006.01)
  *F16D 57/00* (2006.01)
  *F16D 65/16* (2006.01)
  *F16H 57/04* (2010.01)

(52) U.S. Cl.
  CPC ......... *F16D 65/16* (2013.01); *F16H 57/0436* (2013.01)

(58) Field of Classification Search
  USPC .......................................... 192/218
  See application file for complete search history.

(56) References Cited

U.S. PATENT DOCUMENTS

| | | | |
|---|---|---|---|
| 2010/0311532 A1 | 12/2010 | Bohnstedt | 475/159 |
| 2012/0317968 A1 | 12/2012 | Fudouji | 60/468 |
| 2014/0113759 A1 | 4/2014 | Menne et al. | 475/91 |
| 2015/0129363 A1 | 5/2015 | Wanninger | |

FOREIGN PATENT DOCUMENTS

| | | |
|---|---|---|
| EP | 0 367 008 A1 | 5/1990 |
| EP | 1 224 408 B1 | 10/2008 |
| EP | 2 258 593 A2 | 12/2010 |
| EP | 2909067 A1 | 8/2015 |
| GB | 574 119 A | 12/1945 |
| WO | WO 2005/085683 A1 | 9/2005 |
| WO | WO 2007/020433 A1 | 2/2007 |
| WO | WO 2014/062111 A1 | 4/2014 |
| WO | WO 2015/072912 A1 | 5/2015 |

OTHER PUBLICATIONS

Office Action dated Feb. 26, 2019 in corresponding Swedish Patent Application No. 1851100-6.
Office Action dated Nov. 7, 2019 in corresponding Swedish Patent Application No. 1851100-6.
International Search Report dated Nov. 6, 2019 in corresponding PCT International Application No. PCT/SE2019/050800.
Written Opinion dated Nov. 6, 2019 in corresponding PCT International Application No. PCT/SE2019/050800.
May 3, 20220—(EP) Extended Search Report—App. No. 19861861.3.
Jun. 8, 2023—(BR) Office Action—App. No. BR112021004175-3.

* cited by examiner

RETARDER ARRANGEMENT AND RELATED DEVICES

CROSS-REFERENCE TO RELATED APPLICATIONS

The present application is a 35 U.S.C. §§ 371 national phase conversion of PCT/SE2019/050800, filed Aug. 28, 2019, the contents of which are incorporated herein by reference, which claims priority of Swedish Patent Application No. 1851100-6, filed Sep. 18, 2018, the contents of which are incorporated by reference herein. The PCT International Application was published in the English language.

TECHNICAL FIELD

The present invention relates to a retarder arrangement configured to brake rotation of a shaft of a vehicle. The present disclosure further relates to a transmission arrangement for a vehicle, wherein the transmission arrangement comprises a gearbox and a retarder arrangement. Moreover, the present disclosure relates to a power train comprising a transmission arrangement, as well as a vehicle comprising a retarder arrangement.

BACKGROUND

Retarders are devices used on vehicles to augment or replace some of the functions of primary braking arrangements, such as friction-based braking arrangements. Several types of retarders exist. One common type of retarder is a hydrodynamic retarder. Such retarders utilize the viscous drag forces of a liquid in a work space between a rotor and a stator. The rotor is usually connected to a shaft of the vehicle, such as a shaft of the gearbox of the vehicle, via a retarder transmission. Traditionally, the work space has been emptied of liquid when the retarder is not used for braking. In general, due to environmental concerns, it is an advantage if vehicle arrangements, such as retarder arrangements, have low parasitic losses when not in use. As a reason for this, some retarders utilize coupling devices to mechanically disconnect the rotor of the retarder from a driving shaft in order to minimize parasitic losses when the retarder is not in use.

Retarders are capable of providing several advantages. As an example, they are less likely to become overheated in comparison to friction-based braking arrangements, for example when braking a vehicle travelling downhill. Furthermore, when they are used, retarders lower wear of primary friction-based braking arrangements. However, retarders, and their associated arrangements, such as retarder transmissions, control arrangements, lubrication arrangements, and the like, add cost and complexity to a vehicle.

In addition, generally, on today's consumer market, it is an advantage if products, such as vehicle arrangements, comprise different features and functions while the products have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a retarder arrangement configured to brake rotation of a shaft of a vehicle. The retarder arrangement comprises a retarder rotor, a retarder transmission, a lubricant feed conduit arranged to conduct lubricant to the retarder transmission, a coupling device, and an actuator element connected to the coupling device. The actuator element is moveable between an actuated position and an unactuated position to move the coupling device between an engaged state and a disengaged state. In the engaged state, the coupling device is configured to connect the retarder rotor to the shaft via the retarder transmission, and in the disengaged state, to disconnect the retarder rotor from the shaft. The lubricant feed conduit comprises a valve mechanically connected to the actuator element. The valve is arranged to assume an open position when the actuator element is in the actuated position and to assume a closed position when the actuator element is in the unactuated position.

Due to these features, the valve will assume the open position when the actuator element is in the actuated position, i.e. when the retarder rotor is connected to the shaft via the retarder transmission. Moreover, the valve will assume the closed position when the actuator element is in the unactuated position, i.e. when the retarder rotor is not connected to the shaft via the retarder transmission. As a result, the retarder transmission is lubricated via the lubricant feed conduit only when needed, i.e. only when the retarder rotor is connected to the shaft via the retarder transmission. Since the valve is arranged to assume the closed position when the actuator element is in the unactuated position, unnecessary pumping losses are avoided for lubricating the retarder transmission when the retarder arrangement is not used for braking the shaft. Thereby, parasitic losses caused by the retarder arrangement is further lowered when the retarder arrangement is not used for braking the shaft.

Furthermore, due to these features, only one actuator can be used to control the connection of the rotor and to control the opening state of the valve. In addition, only one position sensor can be used to monitor the position of the actuator element to obtain information of whether the retarder rotor is connected to the shaft and of whether the valve is in the open or closed position. Moreover, the need for complex and costly control arrangements controlling a lubricant valve is circumvented.

Accordingly, a retarder arrangement is provided having low parasitic losses when not in use as well as conditions and characteristics suitable for being manufactured and assembled in a cost-efficient manner.

Accordingly, a retarder arrangement is provided overcoming, or at least alleviating, at least some of the above-mentioned problems and drawbacks. As a result, the above-mentioned object is achieved.

Optionally, the retarder arrangement comprises a seat, wherein the actuator element is movably arranged in the seat, and wherein the valve is formed by portions of the actuator element and the seat. Thereby, a simple and reliable valve is provided having conditions and characteristics suitable for being manufactured and assembled in a cost-efficient manner. Moreover, a valve is provided requiring little space.

Optionally, the lubricant feed conduit comprises a first and a second aperture at the seat, and wherein the valve is formed by a channel in the actuator element arranged to superimpose the first and second apertures, when the actuator element is in the actuated position. Thereby, a simple and reliable valve is provided having conditions and characteristics suitable for being manufactured and assembled in a cost-efficient manner.

Optionally, a surface of the actuator element is arranged to block at least one of the first and second apertures, when the actuator element is in the unactuated position. Thereby, a simple and reliable valve is provided having conditions and characteristics suitable for being manufactured and assembled in a cost-efficient manner.

Optionally, the actuator element is elongated and is movable in axial directions thereof between the actuated and the unactuated position, and wherein the channel is formed by a groove in the actuator element. Thereby, a simple and reliable valve is provided having conditions and characteristics suitable for being manufactured and assembled in a cost-efficient manner.

Optionally, the actuator element is rod-shaped, and the groove extends around the entire circumference of the rod-shaped actuator element. Thereby, a valve is provided in which the opening state of the valve is independent of the rotational position of the rod-shaped actuator element. As a result, a simple and reliable valve is provided having conditions and characteristics suitable for being manufactured and assembled in a cost-efficient manner.

Optionally, the retarder arrangement comprises a pneumatic actuator arranged to move the actuator element between the actuated and the unactuated position. Thereby, a simple, efficient, and reliable retarder arrangement is provided capable of controlling the connection of the rotor and the opening state of the valve using the pneumatic actuator.

Optionally, the retarder arrangement is a hydrodynamic retarder arrangement. Thereby, a simple, efficient, and reliable hydrodynamic retarder arrangement is provided having low parasitic losses when the hydrodynamic retarder arrangement is not in use as well as conditions and characteristics suitable for being manufactured and assembled in a cost-efficient manner.

According to a second aspect of the invention, the object is achieved by a transmission arrangement for a vehicle, wherein the transmission arrangement comprises a gearbox and a retarder arrangement according to some embodiments of the present disclosure. Thereby, a transmission arrangement is provided comprising a simple, efficient, and reliable retarder arrangement having low parasitic losses when the retarder arrangement is not in use. Moreover, a transmission arrangement is provided having conditions and characteristics suitable for being manufactured and assembled in a cost-efficient manner.

Optionally, the retarder arrangement is configured to brake rotation of a shaft of the gearbox. Thereby, a transmission arrangement is provided comprising a simple, efficient, and reliable retarder arrangement having low parasitic losses when the retarder arrangement is not in use.

Optionally, the gearbox comprises a lubricant pump arranged to pump lubricant through a lubrication circuit of the gearbox, and wherein the lubricant feed conduit is fluidly connected to the lubricant pump. As a result, a transmission arrangement is provided in which the retarder transmission is lubricated via the lubricant pump only when needed, i.e. only when the retarder rotor is connected to the shaft via the retarder transmission. Since the valve is arranged to assume the closed position when the actuator element is in the unactuated position, unnecessary pumping losses of the lubricant pump are avoided when the retarder arrangement is not used for braking the shaft. During high load operation states of a gearbox, such as during acceleration, the lubrication demand of the gearbox is high. Conversely, during low load operation states of a gearbox, such as during braking, the lubrication demand of the gearbox is low. Thus, since the lubricant feed conduit is fluidly connected to the lubricant pump, and since the retarder arrangement comprises the valve, the lubricant pump can be dimensioned smaller than would be the case otherwise and still cover the lubrication need of the gearbox and of the retarder transmission. Thus, a transmission arrangement is provided having conditions and characteristics suitable for being manufactured in a cost-efficient manner.

According to a third aspect of the invention, the object is achieved by a power train comprising a transmission arrangement according to some embodiments of the present disclosure. Thereby, a power train is provided comprising a simple, efficient, and reliable retarder arrangement having low parasitic losses when the retarder arrangement is not in use. Moreover, a power train is provided having conditions and characteristics suitable for being manufactured and assembled in a cost-efficient manner.

According to a fourth aspect of the invention, the object is achieved by a vehicle comprising a retarder arrangement according to some embodiments of the present disclosure. Thereby, a vehicle is provided comprising a simple, efficient, and reliable retarder arrangement having low parasitic losses when the retarder arrangement is not in use. Moreover, a vehicle is provided having conditions and characteristics suitable for being manufactured and assembled in a more cost-efficient manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
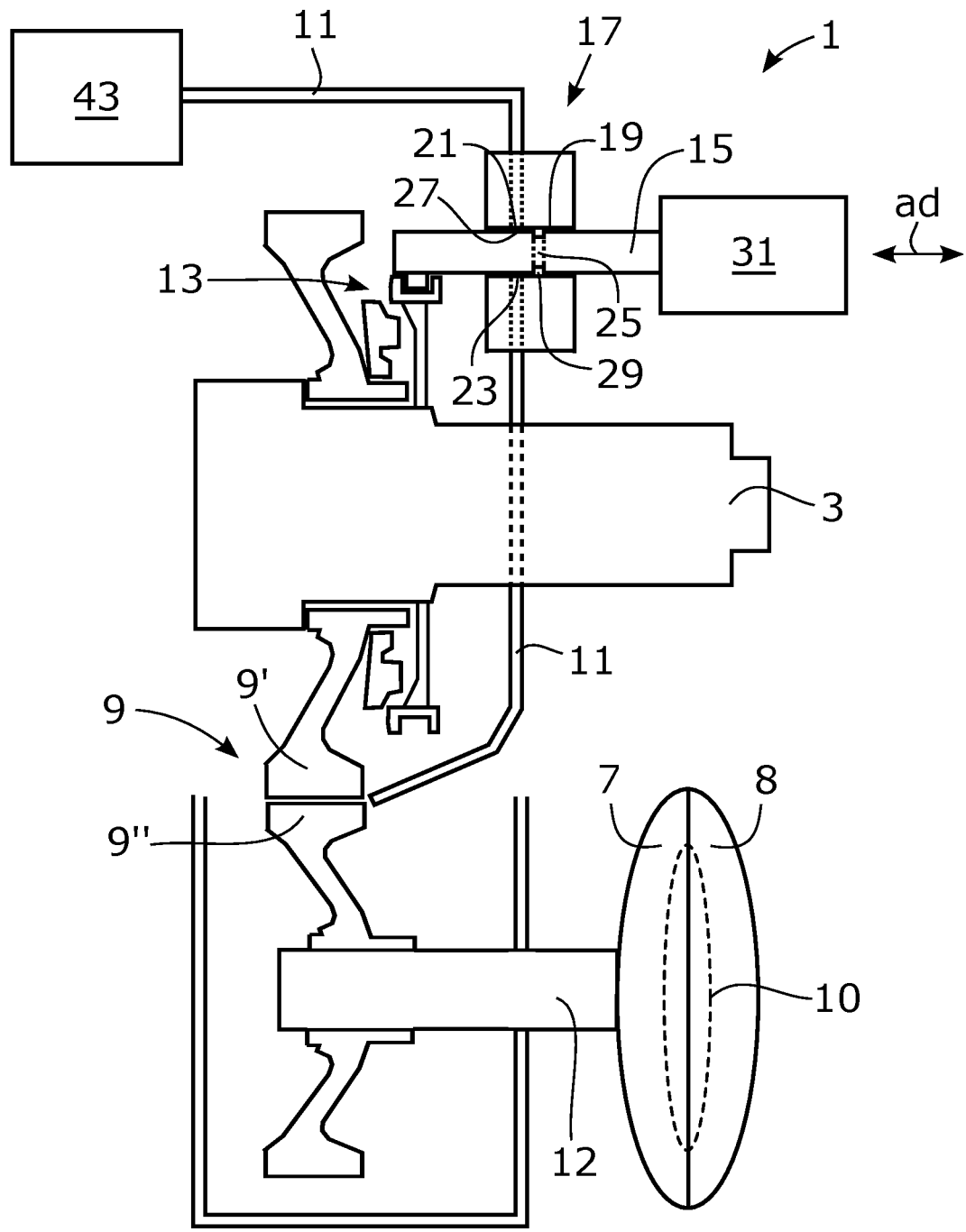
FIG. 1 schematically illustrates a retarder arrangement.

FIG. 1 schematically illustrates a retarder arrangement 1 according to some embodiments. The retarder arrangement 1 is configured to brake rotation of a shaft 3 of a vehicle. The retarder arrangement 1 comprises a retarder rotor 7 and a retarder stator 8 together forming a workspace 10. According to the illustrated embodiments, the retarder arrangement 1 is a hydrodynamic retarder arrangement 1. The workspace 10 is arranged to be filled with a working medium, such as oil or an aqueous mixture, via a retarder circuit. The retarder circuit is not illustrated in FIG. 1. Viscous drag forces of the working medium in the workspace 10 causes a braking torque on a rotor shaft 12 connected to the rotor 7.

The retarder arrangement 1 comprises a retarder transmission 9 comprising a set of gear wheels 9', 9". Moreover, the retarder arrangement 1 comprises a lubricant feed conduit 11 arranged to conduct lubricant to the retarder transmission 9 to thereby lubricate the retarder transmission 9. Furthermore, the retarder arrangement 1 comprises a coupling device 13, and an actuator element 15 mechanically connected to the coupling device 13. The actuator element 15 is moveable between an actuated position and an unactuated position to move the coupling device 13 between an engaged state and a disengaged state. The coupling device 13 is configured to, in the engaged state, connect the retarder rotor 7 to the shaft 3 via the retarder transmission 9, and in the disengaged state, disconnect the retarder rotor 7 from the shaft 3.

According to the illustrated embodiments, the retarder transmission 9 comprises a first gear wheel 9' and a second gear wheel 9". The second gear wheel 9" is arranged on the rotor shaft 12 and the first gear wheel 9' is connectable to the shaft 3 by the coupling device 13. According to the illustrated embodiments, the coupling device 13 is configured to, in the engaged state, connect the first gear wheel 9' of the retarder transmission 9 to the shaft 3. Moreover, the coupling device 13 is configured to, in the disengaged state, disconnect the first gear wheel 9' of the retarder transmission 9 from the shaft 3. Thus, according to the illustrated embodiments, the first gear wheel 9' and a second gear wheel 9" of the retarder transmission 9 will not rotate, or will at least not be driven by the shaft 3, when the coupling device 13 is in the disengaged state. The coupling device 13 may comprise a dog clutch, a synchronizer, or the like.

The lubricant feed conduit 11 comprises a valve 17 mechanically connected to the actuator element 15. The valve 17 is arranged to assume an open position when the actuator element 15 is in the actuated position and to assume a closed position when the actuator element 15 is in the unactuated position. In FIG. 1, the actuator element 15 is illustrated in the unactuated position, and the valve 17 is consequently illustrated in the closed position. The actuator element 15 is elongated and is movable in axial directions ad of the actuator element 15 between the actuated and the unactuated position. According to the illustrated embodiments, the retarder arrangement 1 comprises a seat 19. The actuator element 15 is movably arranged in the seat 19. As is further explained herein, according to the illustrated embodiments, the valve 17 is formed by portions 21, 23, 25, 27 of the actuator element 15 and the seat 19. According to the illustrated embodiments, the lubricant feed conduit 11 comprises a first and a second aperture 21, 23 at the seat 19. The valve 17 is formed by a channel 25 in the actuator element 15 arranged to superimpose the first and second apertures 21, 23 when the actuator element 15 is in the actuated position. Moreover, as indicated in FIG. 1, a surface 27 of the actuator element 15 is arranged to block at least one of the first and second apertures 21, 23 when the actuator element 15 is in the unactuated position.

According to the illustrated embodiments, the retarder arrangement 1 comprises a pneumatic actuator 31 arranged to move the actuator element 15 between the actuated and the unactuated position. According to further embodiments, the retarder arrangement 1 may comprise another type of actuator, such as a hydraulic actuator, electric actuator, or a mechanical linkage connected to a lever, or the like.

Figure 2:
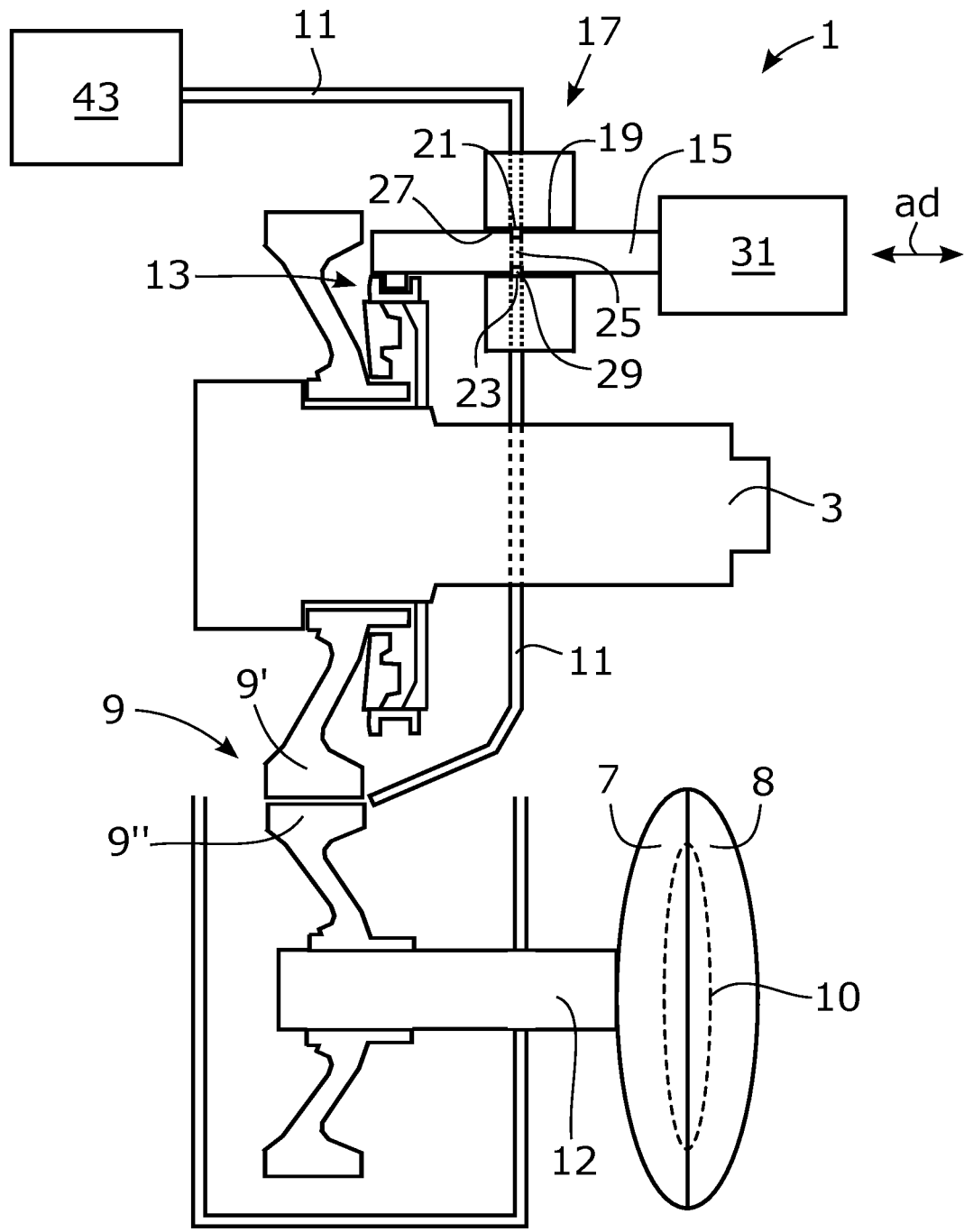
FIG. 2 illustrates the retarder arrangement illustrated in FIG. 1 with an actuator element in an actuated position.

FIG. 2 illustrates the retarder arrangement 1 illustrated in FIG. 1 with the actuator element 15 in the actuated position. Thus, in comparison to the retarder arrangement 1 illustrated in FIG. 1, in FIG. 2, the actuator 31 has displaced the actuator element 15 from the unactuated position to the actuated position. Upon the displacement of the actuator element 15 from the unactuated position to the actuated position, the coupling device 13 is transferred from the disengaged state to the engaged state and the retarder rotor 7 is thereby connected to the shaft 3 via the retarder transmission 9. Moreover, upon the displacement of the actuator element 15 from the unactuated position to the actuated position, the channel 25 in the actuator element 15 is displaced relative to the seat 19 to a position where the channel 25 superimposes the first and second apertures 21, 23. Thereby, lubricant can flow through the valve 17 and the retarder transmission 9 is thus lubricated via the lubricant feed conduit 11.

According to the illustrated embodiments, the channel 25 is formed by a groove 29 in the actuator element 15. Moreover, the actuator element 15 is rod-shaped, and the groove 29 extends around the entire circumference of the rod-shaped actuator element 15. According to further embodiments, the valve 17 may be formed by other types of structures of the actuator element 15 and the seat 19 than as depicted in FIG. 1 and FIG. 2. As an example, the actuator element 15 may comprise a dimple, cavity, pocket, or the like, arranged to superimpose one or more apertures of the seat 19 when the actuator element 15 is in the actuated position. Moreover, instead of being movable in axial directions ad, the actuator element 15 may be rotatably arranged between the actuated and the unactuated position.

When the actuator element 15 is displaced from the actuated position, illustrated in FIG. 2, to the unactuated position, illustrated in FIG. 1, the coupling device 13 is transferred from the engaged state to the disengaged state and the retarder rotor 7 is thereby disconnected from the shaft 3, i.e. the first gear wheel 9' of the retarder transmission 9 is disconnected from the shaft 3. Moreover, upon the displacement of the actuator element 15 from the actuated position to the unactuated position, the actuator element 15 is displaced relative to seat 19 to a position where the surface 27 of the actuator element 15 blocks at least one of the first and second apertures 21, 23. Thereby, lubricant is blocked from flowing through the valve 17 and the lubricant feed conduit 11, and the lubrication of the retarder transmission 9 is thereby cancelled. Thus, according to the embodiments herein, the retarder transmission 9 is lubricated only when needed, in a manner requiring few components, systems, and control arrangements.

As is further explained herein, according to the illustrated embodiments, the lubricant feed conduit 11 is fluidly connected to a lubricant pump 43 arranged to pump lubricant through a lubrication circuit of a gearbox. During high load operation states of a gearbox, the lubrication demand of the gearbox is high. Conversely, during low load operation states of a gearbox, such as during braking, the lubrication demand of the gearbox is low. Thus, since the lubricant feed conduit 11 is fluidly connected to the lubricant pump 43, and since the retarder arrangement 1 comprises the valve 17, the lubricant pump 43 can be dimensioned smaller than would be the case otherwise and still cover the lubrication need of the gearbox and of the retarder transmission 1 at different load conditions of the gearbox.

Figure 3:
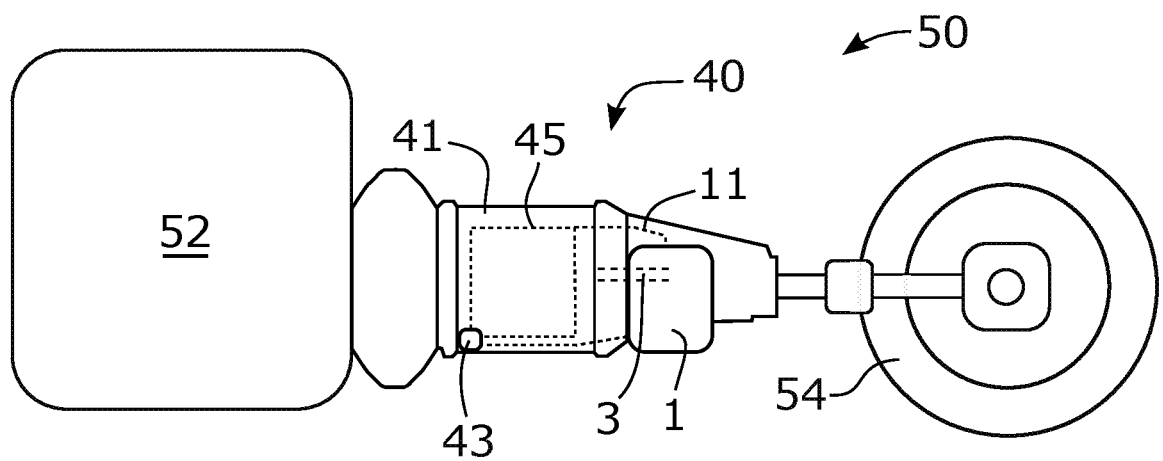
FIG. 3 illustrates a power train for a vehicle.

FIG. 3 illustrates a power train 50 for a vehicle according to some embodiments. The power train 50 comprises a power source 52 and a transmission arrangement 40. The power source 52 may comprise an internal combustion engine, for example a compression ignition engine, such as a diesel engine, or an Otto engine with a spark-ignition device, wherein the Otto engine may be configured to run on gas, petrol, alcohol, similar volatile fuels, or combinations thereof. As an alternative, or in addition, the power source 52 may comprise one or more electrical machines. The transmission arrangement 40 is arranged to transfer torque between the power source 52 and wheels 54 of the vehicle.

The transmission arrangement 40 comprises a gearbox 41 and a retarder arrangement 1 according to the embodiments illustrated in FIG. 1 and FIG. 2. The retarder arrangement 1 is configured to brake rotation of a shaft 3 of the gearbox 41. During braking, the torque applied to the shaft 3 by the retarder arrangement 1 is transferred to the wheels 54 of the vehicle to provide a retardation force to the vehicle.

The gearbox 41 comprises a lubricant pump 43 arranged to pump lubricant through a lubrication circuit 45 of the gearbox 41. As indicated in FIG. 3, the lubricant feed conduit 11 is fluidly connected to the lubricant pump 43. As explained above, due to these features, the lubricant pump 43 can be dimensioned smaller than would be the case otherwise and still cover the lubrication need of the gearbox 41 and of the retarder transmission 1 different load conditions of the gearbox 41. This is done because during high load operation states of the gearbox 41, the lubrication demand of the gearbox 41 is high. Conversely, during low load operation states of the gearbox 41, such as during braking, the lubrication demand of the gearbox 41 is low.

Figure 4:
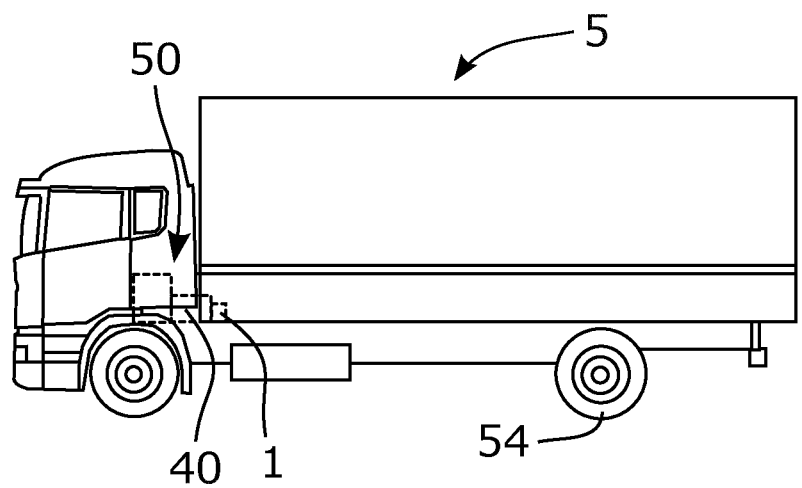
FIG. 4 illustrates a vehicle, according to some embodiments.

FIG. 4 illustrates a vehicle 5 according to some embodiments. The vehicle 5 comprises a power train 50 according to the embodiments illustrated in FIG. 3. The power train 50 is arranged to provide motive power to the vehicle 5 via wheels 54 of the vehicle 5.

According to the illustrated embodiments, the vehicle 5 is a truck. However, according to further embodiments, the vehicle 5, as referred to herein, may be another type of manned or unmanned vehicle for land based propulsion such as a lorry, a bus, a construction vehicle, a tractor, a car, or the like.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A retarder arrangement configured to brake rotation of a shaft of a vehicle, wherein the retarder arrangement comprises:
    a retarder rotor;
    a retarder transmission;
    a lubricant feed conduit arranged to conduct lubricant to the retarder transmission;
    a coupling device; and
    an actuator element connected to the coupling device;
        wherein the actuator element is moveable between an actuated position and an unactuated position to thereby move the coupling device between an engaged state and a disengaged state,
        wherein in the engaged state, the coupling device is configured to connect the retarder rotor to the shaft via the retarder transmission, and in the disengaged state, to disconnect the retarder rotor from the shaft;
        characterized in that the lubricant feed conduit comprises a valve mechanically connected to the actuator element;
        and wherein the valve is arranged and operable to assume an open position when the actuator element is in the actuated position and to assume a closed position when the actuator element is in the unactuated position.

2. The retarder arrangement according to claim 1, wherein the retarder arrangement comprises a seat, and the actuator element is movably arranged in the seat, and wherein the valve is formed by portions of the actuator element and the seat.

3. The retarder arrangement according to claim 2, wherein the lubricant feed conduit comprises a first and a second aperture at the seat, and wherein the valve is formed by a channel in the actuator element arranged and operable to superimpose the first and second apertures when the actuator element is in the actuated position.

4. The retarder arrangement according to claim 3, wherein a surface of the actuator element is arranged and operable to block at least one of the first and second apertures when the actuator element is in the unactuated position.

5. The retarder arrangement according to claim 3, wherein the actuator element is elongated and is movable in axial directions thereof between the actuated and the unactuated position, and wherein the channel is formed by a groove in the actuator element.

6. The retarder arrangement according to claim 5, wherein the actuator element is rod-shaped, and wherein the groove extends around the entire circumference of the rod-shaped actuator element.

7. The retarder arrangement according to claim 1, wherein the retarder arrangement comprises a pneumatic actuator arranged and operable to move the actuator element between the actuated and the unactuated position.

8. The retarder arrangement according to claim 1, wherein the retarder arrangement is a hydrodynamic retarder arrangement.

9. A transmission arrangement for a vehicle, wherein the transmission arrangement comprises a gearbox and a retarder arrangement according to claim 1.

10. The transmission arrangement according to claim 9, wherein the retarder arrangement is configured and operable to brake rotation of a shaft of the gearbox.

11. The transmission arrangement according to claim 9, wherein the gearbox comprises a lubricant pump arranged and operable to pump lubricant through a lubrication circuit of the gearbox, and wherein the lubricant feed conduit is fluidly connected to the lubricant pump.

12. A power train comprising a transmission arrangement according to claim 9.

13. A vehicle comprising a retarder arrangement according to claim 1.

* * * * *